Patented Apr. 26, 1949

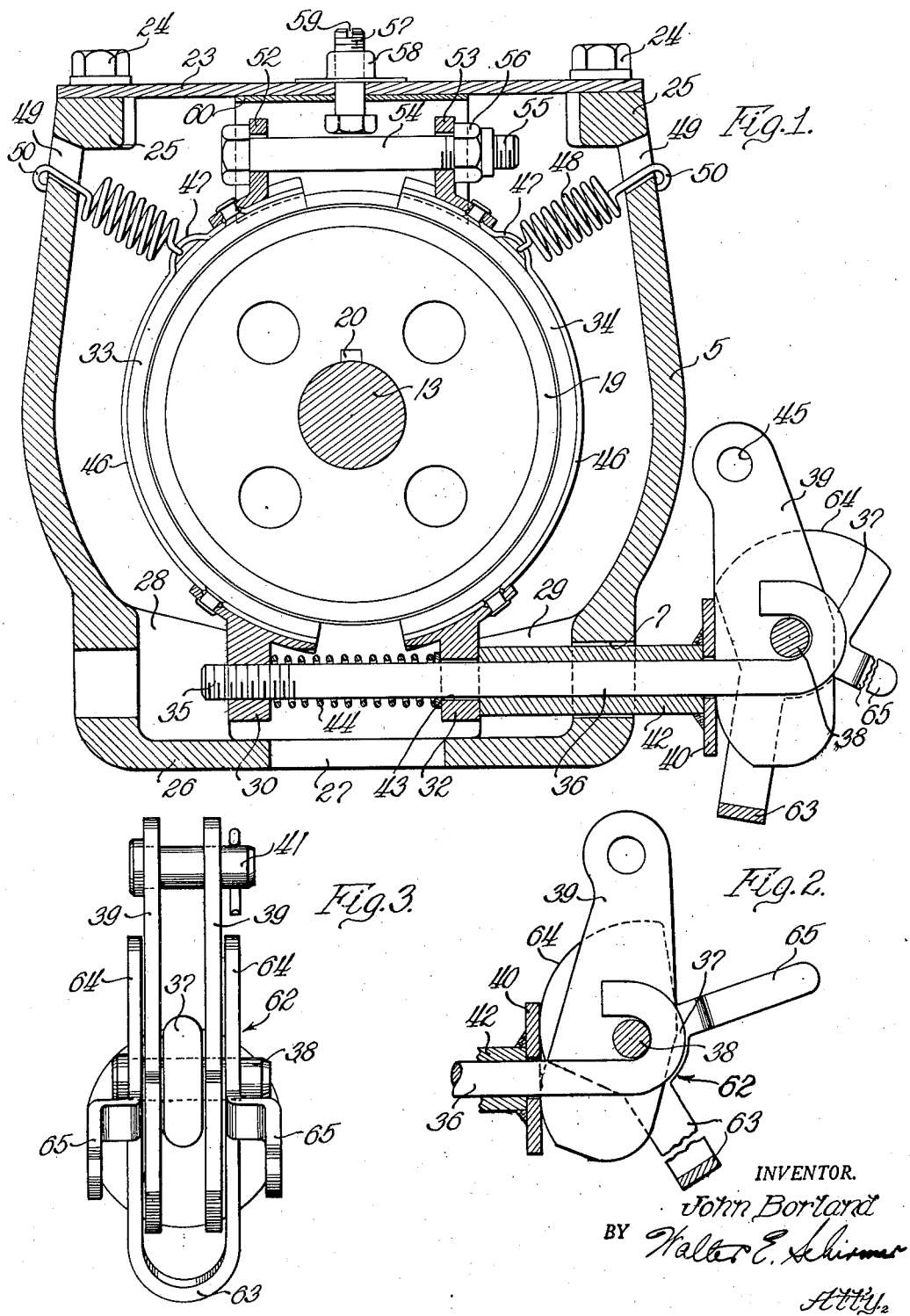

2,468,252

UNITED STATES PATENT OFFICE 2,468,252

BRAKE WITH LOCKING MEANS

John Borland, Buchanan, Mich., assignor to Clark Equipment Company, Buchanan, Mich., a corporation of Michigan Application April 26, 1946, Serial No. 665,140

11 Claims. (Cl. 188—265)

This invention relates to brakes, and more particularly is concerned with a brake construction for application of braking torque to the drive shaft of a vehicle such as a tractor or similar powered implement wherein the braking torque may be used both for stopping the vehicle and as a means for steering the same. While the invention has been disclosed in connection with a specific type of axle drive for tractors, it is understood that the construction may be used in other applications, and consequently the invention should not be limited to the particular installation used for purposes of disclosure.

In my copending application, Serial No. 606,925, filed July 25, 1945, now Patent Number 2,435,867, I have disclosed a brake structure of the general type disclosed herein, and the present invention is to be considered as an improvement over my previous invention in the addition of means providing for a latch or locking mechanism associated with the brake actuating mechanism, whereby the brake may be readily locked in actuated position and, upon further actuation of the brake mechanism, the latching mechanism automatically returns to inoperative position.

In brake assemblies for tractors and similar types of agricultural powered implements or industrial vehicles, it may be desirable, under various conditions, that the brake mechanism be locked in position, such as when the tractor is being used as a power source for driving other implements such as threshing machines, silo fillers, or the like, where the belt pulley of the tractor is being used and the tractor is to be maintained in a stationary position. With the brake construction of my previous application, it was impossible to use the brakes of the tractor as a means for holding the tractor stationary during such operations, and the present invention contemplates the provision of latching means whereby the brakes may be held in locked position to hold the tractor against movement when it is being used as a stationary power source or whenever it is desired to park the tractor and prevent its movement.

Specifically, the present invention contemplates a cam member carried upon the same pivot that supports the brake actuating cam, this member being disposed in close proximity to the operator of the vehicle so that he may reach down and, by a flick of the finger, may lock the brake mechanism in its actuated position, this lock or latch mechanism remaining in such position until a further stress is placed upon the brake actuator in a brake operating direction at which time, the latch mechanism, due to its peculiar construction, will drop out of position automatically, thereby restoring full control of the brakes to the operator independently of the latch mechanism.

Other objects and advantages of the present invention will appear more fully from the following detailed description which, taken in conjunction with the accompanying drawing, will disclose to those skilled in the art, the particular construction and operation of a preferred form of the present invention.

In the drawing:

Figure 1 is a sectional view through an axle construction embodying the present form of brake and latch mechanism;

Figure 2 is a detail view of the latch mechanism shown in locking position; and

Figure 3 is an end elevational view of the brake actuator and latch mechanism.

Considering the drawing in detail, there is indicated in Figure 1 a drive shaft 13 upon which is mounted the hub portion of a brake drum 19. This hub portion may be secured against rotation relative to the shaft 13 by means of the key 20, and is held against axial movement by means of a set screw or the like (not shown). The drum may be assembled into the axle housing 5 through a cover plate 23 which is bolted or otherwise secured by means of studs 24 to suitable bosses 25 formed at the upper face of the housing 5. The housing 5 below the drum 19 is provided with a thickened base portion 26 having a central opening 27 therein, the base portion 26 being provided also with boss portions 28 and 29 which are spaced apart to provide a transverse channel extending centrally therethrough into which depends the lug portions 30 and 32 secured to the lower ends of the brake shoes 33 and 34.

The lug portion 30 of shoe 33 is threaded to receive the threaded end 35 of a J-bolt 36 which has its end 37 turned around a pivot pin 38 carried by the cam member 39, which cam member may, in effect be a pair of similarly shaped cam members disposed on opposite sides of the reversely turned J-bolt portion 37 and provided at their free ends with a clevis pin 41 which may receive a suitable actuating ring or lever.

The cam members 39 in turn rest against a thrust disc 40, which may be fixedly secured as by welding to a sleeve 42, slidably receiving the J-bolt 36 and in turn slidably mounted in the opening 7 formed in the housing 5. The opposite end of the sleeve 42 bears against the lug 32 of the brake shoe 34, and the lug 32 is provided with a clearance opening 43 through which the J-bolt extends for sliding movement. Preferably, a suitable coil spring 44 is disposed between the lugs 30 and 32 to maintain these lugs normally in spaced relation against the adjacent bosses 28 and 29. These bosses are also channeled transversely to allow free movement of the sleeve 42 and J-bolt 36 therethrough when the cam member 39 is rotated toward brake actuating position.

To effect rotation of the cam member 39, any suitable actuating member may be secured to the pin 41 carried in the opening 45 of the cam members so that when the upper end of the cam member is pulled to the right, as viewed in Fig. 1, a resulting equalizing action is produced by the J-bolt 36 and sleeve 42 on lug 32, tending to compress the spring 44 and thereby engage the shoes 33 and 34 about the external surface of the drum 19.

The shoes 33 and 34 are provided with metal bracket strips 46 which, adjacent their upper ends, have raised portions 47 forming eyes for receiving one end of a pair of similar springs 48, the opposite ends of these springs being extended out through the openings 49 in the side walls of the housing 5, and being hooked, as shown at 50, upon the side walls to provide an anchor for the outer ends of the springs. The purpose of these springs is to hold the brake shoes 33 and 34 out of contact with the brake drum 19 until such time as the cam members 39 are actuated.

The opposite ends of the brake shoes 33 and 34 are provided with lugs 52 and 53, respectively, through which extends an adjusting bolt 54 having a threaded end 55 receiving the adjusting nut 56 thereon. This provides a floating adjustment for the ends of the shoes opposite end lugs 30 and 32, and it will be noted that the adjusting bolt 54 is held against end movement by means of an adjustable stud 57 threaded through a boss member 58 welded or otherwise secured to the outside surface of the cover plate 23, with its head end bearing against the upper surface of the adjusting bolt 54. A suitable slot 59 provides for adjustment of the stud 57 to in turn determine the location in a vertical plane of the bolt 54. A suitable shield member 60 of inverted U-shape, as shown in Fig. 1, forms a side retainer for the brake assembly to prevent the moving out of alinement with the drum 19.

It is thus believed apparent that the brake mechanism itself and its operation has been clearly disclosed. Mounted on the pivot pin 38 recessed within the J-bolt 36 is a latch member, indicated generally at 62, this latch member being of a somewhat U-shape having a ball portion 63 projecting an appreciable distance below the pivot 38 and being provided with arcuate cam surfaces 64 on the opposite wings thereof, which cam surfaces 64 are adapted to have camming engagement against the face of the washer 40 when the cam member 39 has been moved into actuating position to move the washer 40 to the left, as viewed in Fig. 1.

If it is desired to lock the brake in its actuated position, the operator merely reaches down from his seat on the vehicle and engages the finger pieces or extensions 65 which are offset out of the plane of the cam members 64, and raises these fingers, thereby rotating the member 62 about the pivot pins 38 so that the cam surface 64 thereof moves into engagement with the outer face of washer 40. When the fingers 65 have been moved upwardly, such as to wedge the cam surfaces 64 against the washer 40, the operator releases the latch member and the spring pressure of spring 44 will engage the washer 40 against the cam surfaces 64 with sufficient frictional pressure to prevent disengagement of the latching member therefrom. This will hold the spring 44 compressed with the shoes 33 and 34 in braking engagement with the drum 19.

In order to release the latching mechanism, it is only necessary to provide a slight rotation of the actuator cams 39 in brake engaging direction, in which case the frictional pressure between the washer 40 and cam surfaces 64 will be released and the counterweight or ball portion 63 of the latch member 62 will cause it to rotate in a clockwise direction, or into the position shown in Fig. 1, thereby releasing the washer 40 so that upon return of the actuator cam 39 to inoperative position, the brake shoes will be disengaged from the brake drum.

It is therefore believed apparent that I have provided a novel type of latch mechanism associated with the brake actuator which can be manually moved to latch position, and is readily accessible to the operator of the vehicle. Furthermore, the latch mechanism is so designed that it will be automatically returned to inoperative position upon actuation of the brake actuating cams whenever it is desired to release the brakes from locked position.

I do not intend to be limited to the exact details of the construction herein shown and described, but only insofar as defined by the scope and spirit of the appended claims.

I claim:

1. A shaft brake construction including a drum mounted on such shaft, a pair of arcuate brake shoes surrounding said drum, projecting lugs on the adjacent ends of said shoes, bolt means extending through said lugs and anchored to one of said lugs, sleeve means surrounding the extending portion of said bolt and abutting against the other lug, means including a pivotally mounted cam member for actuating said bolt means to contract said shoes about said drum and a second pivotally mounted cam member coaxial with said first cam member and having a cam surface engaging the end of said sleeve means for latching said bolt means in actuated position.

2. A shaft brake construction including a drum mounted on said shaft, a pair of arcuate brake shoes surrounding said drum, projecting lugs on the adjacent ends of said shoes, bolt means extending through said lugs, means including a cam member for actuating said bolt means to contract said shoes about said drum, a second pivotally mounted cam member operable to latch said bolt means in actuated position and means on said second cam member for restoring it to inoperative position upon further actuation of said shoes toward contracted position.

3. In a brake construction including a rotatable drum, a pair of arcuate brake shoes therefor anchored at one end and having projecting lugs at their adjacent free ends, a bolt projecting through said lugs and anchored to one of said lugs, sleeve means surrounding the extending portion of said bolt and abutting the other lug, cam means pivotally mounted on said bolt and engaging the end of said sleeve for contracting said shoes about said drum, and secondary cam means rotatable on said bolt into frictional engagement with said sleeve end to latch said shoes against release.

4. The construction of claim 3 wherein said secondary cam means includes means for automatically releasing it from latching position upon further actuation of primary cam means in shoe contracting position.

5. In an actuating mechanism for a shaft brake including a J-bolt and coaxial sleeve respectively engaging adjacent ends of a pair of brake shoes, a cam pivotally carried by said bolt and engaging the end of said sleeve to produce relative movement therebetween for contracting said shoes, and a secondary rotatable cam having a cam surface engaging said sleeve and arranged to be frictionally maintained in position to latch said mechanism in contracted position.

6. The mechanism of claim 5 wherein said secondary cam includes means for rotating it to inoperative position upon release of said frictional engagement thereof with the end of said sleeve.

7. The mechanism of claim 5 wherein said secondary cam has an extension for manually rotating it into latching position.

8. The mechanism of claim 5 wherein said secondary cam is commonly pivoted on said bolt with said actuating cam and has the engaging portion of the cam surface thereof arranged in a line with said pivot in a plane substantially parallel to the axis of said bolt.

9. In a brake actuating mechanism including a bolt and coaxial sleeve respectively engaging lugs at the adjacent ends of a pair of brake shoes, a spring about said bolt normally urging said shoes toward brake releasing position, a pivot on the end of said bolt, an actuating cam carried by said pivot and engaging the free end of said sleeve to produce relative motion between said bolt and sleeve for contracting said shoes, and a latching cam carried by said pivot and arranged to be moved into position for locking said bolt and sleeve against relative movement when in contracted position.

10. The mechanism of claim 9 wherein said latching cam includes means for automatically restoring it to inoperative position upon further movement of said actuating cam in a brake shoe contracting direction.

11. In a brake construction including a rotatable drum, a pair of arcuate brake shoes therefor anchored at one end and having projecting lugs at their adjacent free ends, a bolt projecting through said lugs and anchored to one of said lugs, reaction means abutting the other lug and having a camming surface adjacent the extending portion of said bolt, means pivotally mounted on said bolt for contracting said shoes about said drum and cam means rotatable on said bolt into frictional engagement with said camming surface to latch said shoes against release.

JOHN BORLAND.

REFERENCES CITED

The following references are of record in the file of this patent:

UNITED STATES PATENTS

| Number | Name | Date |
|---|---|---|
| 241,642 | Frick | May 17, 1881 |
| 590,021 | Price | Sept. 14, 1897 |
| 1,282,901 | Masury | Oct. 29, 1918 |
| 1,831,301 | Griffin | Nov. 10, 1931 |

FOREIGN PATENTS

| Number | Country | Date |
|---|---|---|
| 403,606 | Germany | Oct. 2, 1924 |